United States Patent [19]

Jones

[11] Patent Number: 4,601,836
[45] Date of Patent: Jul. 22, 1986

[54] PHOSPHATE ESTER/ALCOHOL MICELLAR SOLUTIONS IN WELL ACIDIZING

[76] Inventor: Loyd W. Jones, Rte. 6, Box 491, Grove, Okla. 74344

[21] Appl. No.: 698,870

[22] Filed: Feb. 6, 1985

Related U.S. Application Data

[63] Continuation-in-part of Ser. No. 619,689, Jun. 13, 1984, abandoned, which is a continuation of Ser. No. 310,899, Oct. 13, 1981, abandoned.

[51] Int. Cl.$^4$ .............................................. E21B 43/27
[52] U.S. Cl. ................................. 252/8.55 C; 166/307
[58] Field of Search ................... 252/8.55 C, 8.55 D, 252/DIG. 17; 166/307

[56] References Cited

U.S. PATENT DOCUMENTS

| | | | |
|---|---|---|---|
| 2,674,619 | 4/1954 | Lundsted. | |
| 2,677,700 | 5/1954 | Jackson et al. | 252/356 X |
| 3,004,056 | 10/1961 | Nunn et al. | 252/174.16 |
| 3,033,889 | 5/1962 | Chiddix et al. | 252/8.55 |
| 3,083,158 | 3/1963 | Markham | 252/8.55 |
| 3,629,127 | 12/1971 | Palmer et al. | 252/538 X |
| 3,819,520 | 6/1974 | Jones et al. | 252/8.55 |
| 4,293,428 | 10/1981 | Gale et al. | 252/8.55 |

FOREIGN PATENT DOCUMENTS 0003183 7/1979 European Pat. Off. .

*Primary Examiner*—Herbert B. Guynn
*Attorney, Agent, or Firm*—Head, Johnson & Stevenson

[57] ABSTRACT

An acidizing additive to be added to an oil well acidizing solution comprising a mixture of a high molecular weight substantially water insoluble alcohol (e.g. isooctyl alcohol), an effective amount of a phosphate ester surfactant (e.g. Klearfax AA-270), to render the alcohol acid soluble, and a low molecular weight alcohol or diol with water diluent. Such an additive can be easily delivered and mixed with an acid solution in the field to produce an acidizing medium of superior oil dispersion characteristics.

29 Claims, No Drawings

PHOSPHATE ESTER/ALCOHOL MICELLAR SOLUTIONS IN WELL ACIDIZING

CROSS-REFERENCE TO RELATED APPLICATIONS

This application is a continuation-in-part of application Ser. No. 619,689 filed June 13, 1984, which is a continuation of Ser. No. 310,899 filed Oct. 13, 1981, both of which are now abandoned.

BACKGROUND OF THE INVENTION

1. Field of the Invention

This invention relates to a process and composition for acidizing an oil and gas well. More specifically, the invention relates to an aqueous micellar acidizing solution containing a high molecular weight alcohol and a phosphate ester surfactant.

2. Description of the Prior Art

The general concept of acidizing oil and gas wells has long been practiced commercially to clean up, stimulate, and to promote hydrocarbon production. Thus the injection of an aqueous solution of an acid such as hydrochloric, hydrofluoric, acetic, or the like is a common practice. Mutual solvents such as alcohols and ethylene glycol monobutyl ether are commonly added to well stimulation acids to enhance solids wetting, lower interfacial tension between acid and oil and to break down emulsion sludges. One particularly useful mixture is isopropyl alcohol and isooctyl alcohol such as described in U.S. Pat. No. 3,819,520 wherein isopropyl alcohol acts as a necessary cosolvent to render the isooctyl soluble and wherein the combination must be used at relatively high concentrations to be effective.

Surface active agents such as oxyalkylated polyols or oxyalkylated alkyl phenols with sulfated oxyalkylated alcohols and glycol ethers are known to be used in acids as are oxyalkylated alcohols and alkyl sulfonate in butyl alcohol for many of the above purposes. Other types of surfactants such as the ethylene oxide adduct of octyl alcohol or nonyl phenols have been used.

However, none of the above are as effective as is desired. The glycol ethers, mixed alcohols, and the like are not as good as the surfactants in wetting oily solids, dispersing solids, or lowering surface and interfacial tension. And, surfactants often form (stabilize) harmful emulsions and are not as effective in promoting oil/acid miscibility as are the higher alcohols, which have very low solubility in aqueous acid solutions.

SUMMARY OF THE INVENTION

In view of the shortcomings of the prior art compositions, I have discovered a novel oil well acidizing solution containing an additive of superior oil dispersion, solubilization, emulsion prevention and solid wetting characteristics when employed with conventional acidizing solutions and acid containing solutions, and aqueous acid containing oil and gas well treating solutions. The acid containing solutions of the present invention comprise: an aqueous acid continuous phase, a $C_4$ to $C_{10}$ substantially water insoluble aliphatic alcohol (or an alcohol of equivalent hydrophobic/hydrophilic balance) and an effective amount of a phosphate ester surfactant to render the alcohol soluble in the aqueous acid continuous phase wherein the phosphate ester surfactant is characterized by the formulas:

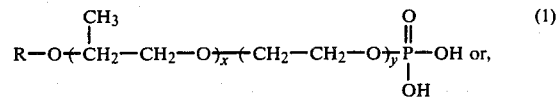

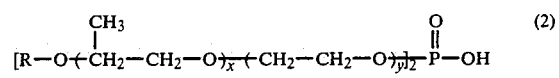

where R is about a $C_8$ to $C_{18}$ alkyl group or about a $C_8$ to $C_9$ alkyl substituted phenyl group, x is from about 2 to 6 and y is from about 12 to 22 and the 2 to 6 moles of propylene oxide are substantially a block polymer attached (bonded) essentially adjacent to the R-O group. According to the present invention at least about 75 parts and preferably 85 to 95 parts by volume of the aqueous acid solution containing up to about 28 wt. % acid is combined with up to 25 parts by volume of a mixture of $C_4$ to $C_{10}$ aliphatic alcohol and the phosphate ester surfactant wherein the mixture comprises up to about 8 parts by volume alcohol to 5 parts by volume surfactant. Thus, the acidizing additive or concentrate according to the present invention comprises: a $C_4$ to $C_{10}$ substantially water insoluble aliphatic alcohol and the phosphate ester surfactant. It is also provided that a water soluble lower molecular weight alcohol (and/or diol) and water mixture be added to the concentrate as a diluent to make the acidizing additive composition more manageable in the field, particularly at low ambient temperatures.

Thus, the present invention provides an acidizing additive essentially consisting of the phosphate ester surfactant to which has been added from about 20 to 160 parts by volume of a $C_4$ to $C_{10}$ substantially water insoluble aliphatic alcohol per 100 parts by volume of the surfactant and a volume of a mixture of a water soluble lower molecular weight alcohol or diol and water, approximately equal to the sum of the volumes of the surfactant and insoluble alcohol and wherein the water is present in a range of about 2 to 20 volume percent of the resulting acidizing additive.

The present invention further provides that the aqueous acid solution be any conventional acidizing medium, that the high molecular weight alcohol be a $C_6$ to $C_8$ alcohol and preferably octyl alcohol and the phosphate ester surfactant preferably be a phosphate ester of an oxyalkylated fatty alcohol.

It is a primary object of the present invention to provide an acidizing additive and solution of improved oil displacing ability during acid treatment of a well and/or aqueous acid flooding of a subterranean formation. It is another object that this additive or acid solution be useful in combination with known acidizing treatments, including as a preflush or spearhead preceding or as a postflush following other solvents and the like. It is a further object that the concentrate or additive be compatible with conventional oil field equipment and procedure including on site mixing with the acidizing solution. The fulfillment of these objects and the presence and fulfillment of other objects will be apparent upon complete reading of the specification and attached claims.

DESCRIPTION OF THE PREFERRED EMBODIMENTS

In general, fulfillment of the objects of this invention are accomplished by incorporating a mixture of a specific type of phosphate ester surfactant and a relatively high molecular weight alcohol into the acid solution being used to treat an oil or gas well. This incorporation can be accomplished by addition of the mixture to the acid solution before injection, as a separate preflush or spearhead slug of solvent, or even as a postflush associated with an acid solution and allowed to mix in situ with the acid solution. The alcohol is selected such that it is substantially water, and therefore acid, insoluble but oil compatible. The phosphate ester surfactant appears to be uniquely suitable in rendering the alcohol soluble, thus producing an acidizing solution of extraordinary oil displacement capabilities.

In U.S. Pat. No. 3,819,520, the advantages of providing an acidizing solution containing octyl alcohols for diplacing oil was established by observing the interfacial tension between the acidizing solution and an oil phase. The octyl alcohols were dissolved in the acid solution due to the presence of a significant (overall) percentage of a cosolvent low molecular weight alcohol. A ternary phase diagram found in the patent, involving 15% HCl, isooctyl alcohol and isopropyl alcohol, indicates that 22 vol. % of isopropyl alcohol would solubilize the octyl alcohols to the extent of 2 vol. % in the acid, while 30 vol. % of isopropyl alcohol would solubilize 20 vol. % of octyl alcohol. U.S. Pat. No. 3,819,520 also disclosed that for all practical purposes there are no alternatives to the octanols, nor to the $C_3$ alcohol cosolvent. Thus, the solubilization of a high molecular weight alcohol by the use of an alcohol cosolvent is not only restricted to the $C_8$ alcohols but also involves at a minimum 24% by volume of the resulting acidizing solution being an additive. Categorically, the dissolving process of the prior art yields a single phase, true solution as opposed to a surfactant and higher alcohol micelle dispersed in a continuous phase of the present invention.

In further contrast, the present invention provides for solubilizing the high molecular weight alcohols by the addition of a specific type of phosphate ester surfactant. The alcohol can be essentially any $C_4$ through $C_{10}$ substantially water insoluble alcohol. All such alcohols (rather than just the octanols) in combination with the phosphate ester surfactant and acid solution have been found to be effective in disintegrating and dispersing oil deposits, sludges and emulsions. After contact with the oil deposits or the like, they produce an essentially oil-free aqueous phase and a water-free oil phase leaving the surfaces of the solids water wet with no apparent emulsion formation. The $C_6$ to $C_8$ alcohols are preferred in that the rates of disintegration and dispersion of the oily sludges are faster within this range. A mixture of closely related isomeric branched-chain primary alcohols of the general formula $RCH_2OH$, where R is a branched heptyl radical, and sold as isooctyl alcohol, as well as capryl alcohol are particularly preferred.

The surfactants employed to render the high molecular weight alcohol soluble in acid solution are categorically phosphate ester surfactants. They are anionic detergents made of mixtures of mono- and di-phosphate esters of oxyalkylated alcohols or oxyalkylated phenols, producing compounds of the following general formulas:

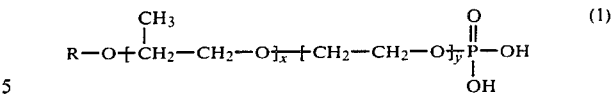

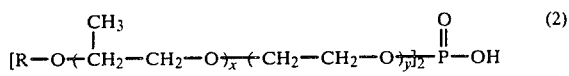

where R is a $C_8$ to $C_{18}$ alkyl group or a $C_8$ to $C_9$ alkyl substituted phenyl group and x and y represent the degree of propoxylation and degree of ethoxylation, respectively. Preferably, the average degree of propoxylation is from about 2 to 6 wherein the distribution of species can vary from x equals to 0 to about 10, while the average degree of ethoxylation is from about 12 to about 18 with the actual distribution of species again ranging from y equals 0 to over 20. For all practical purposes, the presence of an average of 2 moles of propylene oxide essentially adjacent (i.e., bonded) to the hydrophobic starting alcohol or alkylated phenyl is considered critical in that the desired solvency and micellar stability in an aqueous acid media is achieved with as little as 2 moles of propylene oxide. However, the presence of additional propylene oxide (i.e., up to x equals 6) is acceptable. The relationship between the degree of propoxylation and ethoxylation is also considered critical in that a balance of both the relatively hydrophobic propylene oxide and relatively hydrophilic ethylene oxide as well as the sequential transition from the strongly hydrophobic alkyl group to the highly hydrophilic phosphate group through the blocks of propylene oxide followed by ethylene oxide is felt to enhance the stability of the micelle containing the high molecular weight, water insoluble, alcohol while dispersed in the continuous aqueous acid phase. Preferably, at the 2 moles of propylene oxide level, an average of about 14 moles of ethylene oxide is to be present. As the average value of the x approaches 6, more ethylene oxide (i.e., y>14) is required to maintain the hydrophobic/hydrophilic balance.

The phosphate ester surfactant is preferably employed in the acid form; however, the partially neutralized form is equivalent for purposes of this invention to the extent that it is converted to the acid form in an acidizing solution. The particularly preferred phosphate ester surfactants useful in the present invention and their method of synthesis are the phosphate esters of the oxyalkylated fatty alcohols as described in U.S. Pat. No. 3,629,127 herein incorporated by reference as descriptive thereof.

In preparing the acidizing solution, it is preferred that the surfactant and high molecular weight alcohol be preblended, thus producing a concentrated additive that is then mixed with the acidizing solution. However, the mixing of the aqueous acidizing solution with the surfactant and alcohol in any order is equivalently effective, but not as convenient in that the concentrated additive can be transported to the field and then added at the well site as needed.

When employing a concentrate of the surfactant and higher alcohol, the presence of a diluent to suppress the freezing point and control the viscosity of the mix is preferred. The diluent preferably is a low molecular weight water soluble alcohol or diol, such as methanol, ethanol, n-propanol, isopropyl alcohol, t-butyl alcohol, ethylene glycol or the like. Advantageously, the diluent should also contain some water to maintain the highly polar surfactant in solution, particularly in cold weather applications.

The continuous aqueous acid phase of the improved micellar oil and gas well treating solutions according to the present invention can be any of the aqueous solutions of water soluble acids and acid precursors or acid anhydrides as commonly employed for acidizing formations and/or acidic water flooding and the like. Thus, acceptable acids to be employed in the present invention include by way of example, but not limited thereto, HCl, HF, glycolic acid, sulfamic acid, acetic acid, $NH_4HF_2$ as well as a $CO_2$ flooding media and mixtures thereof.

In preparing either the acidizing solution per se, or the additive concentrate composition, the amount of the high molecular weight alcohol present relative to surfactant is preferably at least one part by volume high molecular weight alcohol to four parts by volume phosphate ester surfactant. At this concentration, the acidizing solution will exhibit superior oil dispersion relative to either component individually use with acid. Preferably, the ratio of alcohol to surfactant should not exceed about eight parts by volume alcohol to five parts by volume surfactant. Although concentrations beyond this limit are not considered deliterious, th 8:5 ratio roughly corresponds to the upper limit of the surfactant's ability to solubilize the higher alcohol into acid solution. The ratio of two parts by volume alcohol to three parts by volume surfactant is felt to be a particularly preferred ratio for most alcohol/surfactant compositions.

When preparing a concentrate to be added later to the aqueous acidizing solution, the diluent lower molecular weight alcohol or diol plus water mixture should be present in sufficient quantity to suppress the freezing point, reduce the viscosity and hold the highly polar surfactant in solution. Generally, improvement in the ability to handle the concentrate is observed upon addition of any volume of the alcohol (diol)/water mixture. Preferably, about 50 (or even higher) volume percent alcohol (diol)/water mixture per total volume of the resulting diluted concentrate additive is employed. The corresponding resulting water content should be from about 2 to 20 volume percent in order to prevent the separation of surfactant at low temperatures.

In preparing the acidizing solution, the relative quantity of concentrate to acid solution can be as low as 0.2 vol. % for prevention of acid/oil emulsion. Maximum effectiveness of the additive will occur at up to about 10 to 20 volume percent depending on the relative quantity of surfactant and high molecular weight alcohol, with even higher percentages being operable. A 95 vol. % acid/5 vol. % additive mixture is particularly preferred and suitable for most applications. This concentration is also particularly advantageous relative to the prior art in that presence of the additive does not represent a major economic factor and the resulting acidizing solution is essentially still full strength. Higher concentrations of up to about 25% is very useful where maxium solubilization of oil deposits is desired.

In order to more fully describe and explain the present invention, how it functions and differs from the prior art, and how it is used, a more detailed examination of the experimental basis and observation is appropriate.

In order to find the desired surfactant, one that is effective in solubilizing high molecular weight alcohols in acids, a series of screening experiments was performed using the various known classes of surfactants. The experimental procedure involved adding approximately 40 ml. of a selected concentration of acid solution and approximately 5 ml. of surfactant to a 50 ml. glass-stoppered graduated cylinder. The combination was thoroughly mixed to check solubility. A 1 ml. aliquot of the high molecular weight alcohol was then added. The graduated cylinder was stoppered and shaken. Observation of the behavior of the resulting mixture for solubilization of the alcohol was recorded. The procedure of adding another 1 ml. aliquot of alcohol and shaking was repeated until no further significant change could be detected. The results of the screening tests are as follows.

EXAMPLE I

As a control or blank test, 45 ml. of 15 wt. % HCl and 5 ml. of isooctyl alcohol were added to a 50 ml. glass-stoppered graduated cylinder and vigorously shaken. A hazy dispersion formed which immediately separated into two distinct immiscible layers. After standing for 5 minutes, a 6 ml. slightly hazy oil layer was present on top of a slightly hazy lower acid phase. This behavior was considered typical of the essentially insoluble high molecular weight alcohol in an acid medium.

EXAMPLE II

A 40 ml. aliquot of 15 wt.% HCl and 5 ml. of a liquid surfactant (oxyalkylated polyols, oxyalkylated alkyl phenols with sulfated oxyalkylated alcohols and glycol ethers) sold under the trade name Tretolite AY 31, were placed in the graduated cylinder and mixed. A clear solution with foam resulted. Upon adding the first ml. of isooctyl alcohol, a hazy dispersion was observed. The second ml. of isooctyl alcohol produced a cloudy dispersion with evidence of separation. Third, fourth, and fifth mls. of isooctyl alcohol were added with separation of an amber oil emulsion which rose to the top. After the fifth ml. was added, the emulsion phase was 7 ml. in volume after five minutes of standing. From this it was concluded that little or no solubilization of the isooctyl alcohol takes place when AY 31 is the surfactant.

EXAMPLES III-V

The above procedure of EXAMPLE II was repeated substituting 5 ml. of capryl alcohol, normal octanol, or decyl alcohol for the isooctyl alcohol. The results were identical to EXAMPLE II except the separation developed more rapidly in the case of decyl alcohol.

EXAMPLE VI

The procedure of EXAMPLE II was repeated using 40 ml. of 15 wt.% HCl and 5 ml. of the 9.5 mole ethylene oxide adduct of nonyl phenol, sold under the trade name Surfonic N-95, was added as the surfactant. The Surfonic N-95 lumped and curdled when added to the acid. Heating and vigorous stirring resulted in a clear, very foamy solution. Upon adding the first ml. of isooctyl alcohol and shaking, a clear solution except for air bubbles resulted. The second ml. of isooctyl alcohol was essentially identical in results with some phase separation. The third ml. produced a hazy solution with entrained air bubbles and a separation of an oil layer. With the fourth ml. of isooctyl alcohol the solution appeared to clear somewhat but a fifth ml. resulted in an opaque emulsion and no foam. The solutions after the second ml. addition were viscous. After fifteen minutes of standing (5 ml. of isooctyl), 3 ml. of clear oil developed on top of about 36 ml. of an intermediate layer of hazy loose emulsion. Apparently more isooctyl alcohol phase was still separating. After one hour, three clear layers were observed; 10 ml. on the bottom, 31 ml. intermediate and 9 ml. of oil on top. Surfonic N-95 is concluded to be a weak solubilizer for isooctyl alcohol in acid and it stabilizes emulsions.

EXAMPLE VII

The above procedure was repeated using 40 ml. of 15 wt.% HCl. and 5 ml. of commercial surfactant believed to be oxyalkylated alcohol and alkyl sulfonate in butyl alcohol sold under the trade name of Morflo II. A clear amber solution with a slight haze resulted. Upon addition of successive 1 ml. aliquots of isooctyl alcohol the solution turned to: a hazy dispersion after the first ml., to a cloudy dispersion after the second, and to an emulsion with oil phase separation from the third and subsequent aliquots. After a total of 5 ml. of isooctyl alcohol was added, 1½ ml. of separation was observed. After 5 minutes of standing, 12 ml. of heavy emulsion was present with the rest being hazy. It is concluded that Morflo II is a poor solubilizer of isooctyl alcohol in 15 wt. % HCl.

EXAMPLE VIII

Using the same screening procedure, 40 ml. of 15 wt. % HCl was mixed with 5 ml. of a phosphate ester surfactant sold under the trade name Klearfac AA-420 by BASF Wyandotte Corporation and identified (see Toxic Substances Control Act (TSCA) Chemical Substance Inventory, vol III, "User Guide and Indices to the Initial Inventory; Substance Name Index", May 1979) as oxirane, methyl-, polymer with oxirane, mono-$C_{12}$–$C_{18}$-alkyl ethers, phosphates consistent with the formulas (1) and (2). A clear solution with slight foam resulted. The first three additions of 1 ml. aliquots of isooctyl alcohol were solubilized resulting in a clear solution. The fourth ml. produced a hazy stable mixture and the fifth a stable emulsion. After a total of 5 ml. of isooctyl alcohol added and fifteen minutes of standing, 1 ml. of clear oil separated on top. The performance of this phosphate ester surfactant appears superior to other surfactants previously tested.

EXAMPLE IX

A second phosphate ester surfactant sold under the trade name Klearfac AA-040 and similar to AA-420 was tested by making a clear solution from a combination of 5 ml. of surfactant with 40 ml. of 14 wt. % HCl. Again the addition of the first ml. of isooctyl alcohol produced a clear solubilized solution, with slight hazing produced by the addition of the second ml. of alcohol. The third ml. produced a hazy dispersion of emulsion with the fourth resulting in an emulsion. The fifth ml. of isooctyl alcohol produced a white emulsion which after fifteen minutes of standing resulted in 2 ml. of slightly hazy oil coming to the top of the emulsion.

EXAMPLE X

A third phosphate ester surfactant marketed as Klearfac AA-270 and identified as oxirane, methyl-, polymer with oxirane, mono-$C_{10}$–$C_{16}$-alkyl ethers, phosphates again consistent with formulas (1) and (2) was similarly tested. To the clear solution, successive 1 ml. aliquots of isooctyl alcohol were added followed by mixing. However, in this case a total of 9 ml. was added before the resulting mixture changed from a clear solution with possibly very slight haze (8 ml.) to a translucent haze (9 ml.) but still categorically a stable mixture. Even after two hours, the 9 ml. mixture was still a hazy stable dispersion with no apparent separation. Only slight foam and opalescence from about the fourth through the seventh ml. of isooctyl alcohol was observed. This composition (9 ml. isooctyl alcohol, 5 ml. Klearfac AA-270, and 40 ml. of 15 wt. % HCl) was left standing overnight. When observed the next day, 4 ml. of clear oil formed a top layer and the bottom 50 ml. layer was a clear, stable solution. Thus, 5 ml. of Klearfac AA-270 can permanently solubilize at least about 5 ml. of isooctyl alcohol into 15 wt. % HCl; more specifically, into an approximately 25% solution by volume of surfactant and 75% by volume of 15 wt. % HCl. This suggests the presence of a specific stoichiometry possibly characteristic of the formation of a coordination complex or the like in solution.

In view of the above EXAMPLES, the specific phosphate esters of equation (1) and (2) as a class appear far superior to other types of surfactants for solubilizing isooctyl alcohol into hydrochloric acid.

EXAMPLES XI–XIV

In order to test the solubility (more specifically the solubilization) of other alcohols by the phosphate ester surfactant in acid solution, 5 ml. samples of hexanol, capryl alcohol, n-octanol, and decyl alcohol were added to separate graduates containing mixtures of 40 ml. of 15 wt. % HCl and 5 ml. of Klearfac AA-270. All but the decyl alcohol results in a clear solution indicative of excellent solubilization of the alcohol. The decyl alcohol resulted in a hazy, stable dispersion characteristic of good solubilization.

EXAMPLES XV–XVIII

In order to determine alternate commercially acceptable compositions, a series of experiments was performed to test the concept of producing a concentrate of a high molecular weight alcohol admixed with a phosphate ester surfactant that could be dissolved at any concentration in well treating acids, such as 5% to 20% HCl and HCl/HF mixtures (i.e., mud acids). The experiments were designed to develope a concentrate that could be easily marketed as a well acidizing additive that could be delivered directly to the field and then added to the acidizing medium. As such, the concentrate needs to be stable, of low viscosity to facilitate handling, and have a low freezing point. To achieve these pragmatic considerations the presence of various carriers was explored.

In EXAMPLE XV, 25 ml. of phosphate ester surfactant (Klearfac AA-270) was added to 25 ml. of isooctyl alcohol and 50 ml. of isopropyl alcohol as a carrier (viscosity lowering agent and freezing-point depressant). Upon stirring, a clear solution resulted. A 5 ml. sample of the above mixture was added to 95 ml. of a 15 wt.% HCl solution. Upon shaking a hazy dispersion resulted. An additional 5 ml. sample of the original alcohol/surfactant mixture was added to the acid dispersion with agitation. A clear solution resulted. From this it was concluded that an increase in the ratio of surfactant to high molecular weight alcohol is needed for solubility at low total concentrations.

In EXAMPLE XVI, a concentrate was prepared by mixing 35 ml. of Klearfac AA-270, 15 ml. of isooctyl alcohol, and 50 ml. of isopropyl alcohol. Again a clear solution resulted. Using this concentrate, clear solutions were made at 0.5, 1.0, 3.0, 5.0, and 10.0 vol.% of concentrate in 5 wt.% HCl, 10 wt.% HCl, 15 wt.% HCl, and 20 wt.% HCl, indicative of solubility at all concentrations. Solubility was also observed in HCl/HF mixtures.

In EXAMPLE XVII, in order to establish other possible viscosity lowering agents and freezing-point depressants, 30 ml. of Klearfac AA-270 and 20 ml. of isooctyl alcohol were combined to form a clear solution. This mixture was tested and found to be soluble at all concentrations in methanol, isopropyl alcohol, butyl alcohol and ethylene glycol.

In EXAMPLE XVIII, a mixture of 300 ml. of Kearfac AA-270, 200 ml. of isooctyl alcohol, 400 ml of isopropyl alcohol, and 100 ml. of water was prepared. The clear solution was saved for pour point and physical property testing. The water was added to ensure that the very polar phosphate ester surfactant would remain in solution when the mixture was chilled.

From the above data, it was felt that the concentrate compositions of EXAMPLES XI–XIV were acceptable for use as acid additives for emulsion prevent, well cleaning and stimulation in general and as a desludger, wetting agent, dispersant, mutual solvent, and solubilizer. It was further found that the amount of concentrate needed in the final acid was as little as 0.2% for prevention of acid/oil emulsions and up to 10 to 20% by volume for maximum effectiveness. About 5 vol. % of concentrate in acid should be suitable for most applications.

EXAMPLE XIX

Another commercially available phosphate ester surfactant sold under the trade name Pluraflo OF-90 (now Pluradyne OF-90) by BASF Wyandotte Corporation under the representation as being compositionally the same as Klearfac AA-270 and independently confirmed by mass spectral analysis as a propoxylated $C_{10}H_{21}$ fatty alcohol with 2 moles of propylene oxide (PO) being the major series and 3 moles of PO also present as a minor series followed by an ethylene oxide (EO) block terminating in a phosphate unit, wherein up to 6 moles of PO were observed and up to 22 moles of EO were observed, was tested in a manner similar to EXAMPLE II by placing 40 ml. of 15 wt. % HCl and 5 ml. of Pluraflo OF-90 in a glass-stoppered graduated cylinder. After mixing, a clear solution was produced to which successive 1 ml. aliquots of isooctyl alcohol were added with agitation. After the third 1 ml. addition a slight opalescence was observed in the otherwise clear single-phase solution. At the end of the fifth or sixth ml. aliquot, the opalescence developed into a slight hazy appearance. The seventh ml. of isooctyl alcohol exhibited a stable dispersion with the eighth addition resulting in a cloudy emulsion. The overall performance of Pluroflo OF-90 was consistent with that of EXAMPLE II except that the surfactant is probably not as concentrated as indicated by the somewhat lower capability to solubilize the higher alcohol, but overall it is a highly acceptable alternative to the Klearfac AA-270.

EXAMPLE XX

In order to test the effect of mixing types or classes of surfactants, a 20 ml. sample of Klearfac AA-270 was added to 10 ml. sample of Surfonic N-95 (phosphate ester nonionic surfactant mixture). To 40 ml. of 15 wt.% HCl was added 5 ml. of the surfactant mixture producing a clear solution. Again, upon addition of 1 ml. aliquots or isooctyl alcohol a light haze to hazy dispersion developed after the third successive ml. The fourth ml. cleared to a slight haze and the fifth produced a cloudy emulsion that appeared unstable. From this it was concluded that there is no advantage associated with the use of mixed types or classes of surfactants.

EXAMPLE XXI

To illustrate the beneficial effects of the present invention, a comparative visual test of the dissolving characteristics of a series of six acidizing compositions was performed. The first acidizing composition was a 5 vol.% solution of the composition of EXAMPLE XV using a phosphate ester/high molecular weight alcohol in 95 vol.% of 15 wt.% HCl. The five other comparators were known commercially available alternatives including: a 10 vol.% ethylene glycol monobutyl ether in 15 wt.% HCl; a 35 vol.% blend of isopropyl and isooctyl alcohol in 15 wt.% HCl sold under the trade name A-Sol and prepared according to U.S. Pat. No. 3,819,520; a 5 vol.% of surfactant AY 31 in 15 wt.% HCl (EXAMPLE II); a 5 vol.% of surfactant Morflo II in 15 wt.% HCl (EXAMPLE VII); and a 5 vol.% of surfactant Surfonic N-95 in 15 wt.% HCl (EXAMPLE VI). Each was used to dissolve an oily scale sludge recovered from a water injection well. The sludge contained about 20% by weight heavy hydrocarbons, 70% by weight acid soluble minerals (primarily calcium carbonate) and 10% by weight clays and silica silt (acid insoluble fines). Essentially identical samples of the sludge were submerged in an excess of each of the respective acidizing solutions. The phosphate ester/high alcohol acidizing solution broke down, dissolved, and dispersed the semisolid sludge much faster than any of the other solutions. The oil floated free to the top and the silt dispersed into the aqueous acid phase.

EXAMPLE XXII

For further testing, a synthetic well sludge was prepared by blending 90 parts by weight calcium carbonate ($CaCO_3$) and 10 parts by weight kaolinite clay. To this mixture was added a heavy, waxy crude oil until a stiff paste was produced.

EXAMPLE XXIII

Five grams of the paste was added to 100 ml. of 15 wt.% HCl in a beaker. Only slow action was observed as evidenced by fizzing ($CO_2$ release) and release of oil. The small amount of liberated oil was sticky and emulsified and the clay stayed in an oily clump. The paste lump was not disintegrated after one hour at room temperature.

EXAMPLES XXIV–XXVI

A phosphate ester/high molecular weight alcohol concentrate of the present invention was prepared containing 30% by volume Klearfac AA-270, 20% by volume isooctyl alcohol, 40% by volume isopropyl alcohol and 10% by volume water. Therefore, a 100 ml. test sample of 5 vol.% mixture of the concentrate in 15 wt.% HCl would contain the equivalent of 1.5 ml. of Klearfac, 1.0 ml. of isooctyl alcohol, and 2.0 ml. of isopropyl alcohol.

A similar 100 ml. acidizing solution without the high molecular weight alcohol was prepared, containing 1.5 ml. Klearfac, 2.0 ml. isopropyl alcohol, and 96.5 ml of 15 wt.% HCl. Also, a 100 ml. acidizing mixture was prepared by combining 1.0 ml. of isooctyl alcohol, 2.0 ml. of isopropyl alcohol and 97.0 ml. of 15 wt.% HCl, without the phosphate ester surfactant being present. This mixture was hazy and separation would take place unless frequently agitated.

A 5 gram sample of the synthetic oil well sludge of EXAMPLE XXII was placed in each of the 100 ml. acidizing solutions. The solution containing no isooctyl alcohol disintegrated the sludge faster than the plain 15 wt.% HCl solution of EXAMPLE XXIII. It took about thirty minutes for the glob to disappear. The oil on top was emulsified (gummy) with no evidence of being dispersed. The solids appeared to be water wetted. The results were better than nothing but not sufficient.

The solution containing no surfactant was only slightly better than plain HCl. Most of the isooctyl alcohol appeared to float to the top. No foaming was observed. Freed oil was present in the isooctyl alcohol phase. No emulsion was observed. After one hour the 5 gram sample of oily paste had not entirely disintegrated.

In the case of the acidizing solution containing both the isooctyl alcohol and the Klearfac surfactant, very rapid disintegration of the oily paste took place with evolution of copious amounts of foam. No emulsion was observed. The solution turned dark from solubilized oil (some free oil in the foam). All of the sludge was gone in ten minutes. The solids suspended in the lower aqueous phase were water wetted.

From the above it was concluded that the phosphate ester/high molecular alcohol mixture, in proper ratio, combines to make a composition that is soluble in acid (15 wt.% HCl) and the resulting composition is far superior to either constituent alone in disintegrating, dissolving, and dispersing oily sludges that clog oil wells and injection wells. The new composition prevents emulsification and foams better than the surfactant alone, indicating it has more surfactancy or detergency.

EXAMPLES XXVII–XXVIII

In order to determine the effect of varying the relative proportion of the surfactant to high molecular weight alcohol, the following two concentrate compositions were prepared.

| CONCENTRATE 1 | CONCENTRATE 2 |
| --- | --- |
| 20 vol. % Klearfac AA-270 | 40 vol. % Klearfac AA-270 |
| 30 vol. % isooctyl alcohol | 10 vol. % isooctyl alcohol |
| 40 vol. % isopropyl alcohol | 40 vol. % isopropyl alcohol |
| 10 vol. % water | 10 vol. % water |

A 5 ml. sample of Concentrate 1 was added to 95 ml. of 15 wt.% HCl, producing a cloudy dispersion (emulsion). Upon adding 5 grams of the oily well sludge of EXAMPLE XXII, a slow reaction took place with much less foaming than EXAMPLE XXVI. It took 20 to 30 minutes to break down the oily glob. The excess isooctyl alcohol may have been responsible for the slow reaction because of "oil wetting" of the solids in the sludge.

5 ml. of Concentrate 2 added to 95 ml. of 15 wt.% HCl produced a clear acidizing solution. Adding 5 gms. of the oily sludge to 100 ml. of the the acidizing medium containing Concentrate 2 resulted in a more rapid reaction but not as fast as EXAMPLE XXVI. It took about 20 minutes to disperse the sludge.

From the composite of the previous examples, it can be seen that phosphate ester surfactants such as Klearfac AA-270 can solubilize (probably by micellar solution) high molecular weight alcohols, such as octyl alcohols, into acid solution at a ratio of up to about 8 parts alcohol to 5 parts surfactant. The most stable solution was achieved with equal parts of surfactant and high molecular weight alcohol where the total concentration of the composition (surfactant/alcohol complex) is about 25 vol.% in acid. When total concentration is only 5 vol.% in acid (desirable for economic reasons) the best ratio is about 3 parts surfactant and 2 parts high molecular weight alcohol. As little as 1 part high molecular weight alcohol to 4 parts surfactant is superior to the surfactant alone. For most purposes the alcohol alone is not acceptable due to low solubility.

EXAMPLES XXIX–XXX

In order to test various high molecular weight alcohols, a series of three concentrates was prepared using n-butyl alcohol, normal hexanol and normal decanol. Each concentrate was made up of 30 vol.% Klearfac, 20 vol.% high molecular weight alcohol, 40 vol.% isopropyl alcohol and 10 vol.% water. Three corresponding acidizing solutions were prepared by adding 5 vol.% of the concentrate to 95 vol.% of 15 wt.% HCl. Each resulting acidizing solution was tested for ability to decompose the synthetic oil well sludge in a manner identical to the previous examples. All worked fairly well to disintegrate and disperse the sludge but the solutions with butyl alcohol and decanol were not much faster than the surfactant alone, confirming that $C_6$–$C_8$ alcohols are preferred but $C_4$–$C_{10}$ will work. All the higher alcohols ($C_4$–$C_{10}$) cause the oil phase of the sludge to break out clean with no apparent emulsion formation. This is an improvement, even for the slower acting alcohols ($C_4$–$C_{10}$), over the use of the surfactant (phosphate ester) alone for well treatment. This property is probably related to the preferential solubility of the higher alcohols into the oil phase of the sludge. For example, isopropyl alcohol which is much more water soluble than butyl alcohol did not produce the emulsion prevention effect when used with Klearfac. Therefore it is apparent that the compositions of the present invention require an alcohol with low water solubility to achieve enhanced penetration of the oily sludges and to minimize formation of emulsions.

EXAMPLES XXXI–XXXVII

In order to establish recommended levels of water in the concentrate a series of 7 concentrate solutions were prepared as follows:

| CONCENTRATE | 1 | 2 | 3 | 4 | 5 | 6 | 7 |
| --- | --- | --- | --- | --- | --- | --- | --- |
| Vol. % Klearfac AA-270 | 30 | 30 | 30 | 30 | 30 | 30 | 30 |
| Vol. % isooctyl alcohol | 20 | 20 | 20 | 20 | 20 | 20 | 20 |
| Vol. % isopropyl alcohol | 50 | 48 | 47 | 45 | 40 | 35 | 30 |
| Vol. % water | 0 | 2 | 3 | 5 | 10 | 15 | 20 |

A pour point test according to ASTM method D-97 was performed on each of the above solutions. TABLE I summarizes the results.

TABLE I

| CONCENTRATE | OBSERVATION |
| --- | --- |
| 1 | heavy separation of white solid lumps at +8 F. |

TABLE I-continued

| CONCENTRATE | OBSERVATION |
|---|---|
| 2 | heavy separation of white solid lumps at −27 F. |
| 3 | no separation but high viscosity at −34 F. |
| 4 | no separation but high viscosity at −34 F. |
| 5 | no separation but high viscosity at −34 F. |
| 6 | no separation but high viscosity at −34 F. |
| 7 | lumpy separation at −25 F.; froze solid at −34 F. |

From the above it was concluded that at least 2% water and not greater than about 18% water is preferred in producing a concentrate that will flow under a broad range of temperatures. The specific gravities of concentrate 4 (5% water) and concentrate 6 (15% water) were determined to be 0.925 and 0.950, respectively. A flash point of 78° C., fire point of 88° C., and viscosity (at 10° C.) of 38 cp were determined for concentrate 6 (ASTM D-93).

EXAMPLE XXXVIII

In order to further demonstrate that the phosphate ester and high molecular weight alcohol are soluble in acid without the presence of a diluent and that the resulting acidizing solution is highly effective, a 60 ml. sample of Klearfac AA-270 was mixed with 40 ml. of isooctyl alcohol making a clear viscous solution. Upon mixing the above with hydrochloric acid at both the 5 and 15 wt.% strengths, it was established that the surfactant/high molecular weight alcohol blend is soluble at all proportions. Thus the lower molecular weight alcohol is not necessary for solubilization of the high molecular alcohol in acid.

A 5 ml. sample of the surfactant/alcohol blend above was mixed with 95 ml. of 5 wt.% HCl and added to 5 grams of the synthetic oily sludge. The sludge disintegrated and dissolved rapidly.

A 1 ml. sample of the surfactant/alcohol blend was then added to 99 ml. of 5 wt.% HCl and this was then added to a second 5 gram sample of synthetic oil sludge. Again, the sludge disintegrated and dissolved rapidly.

The process was repeated using 3 ml. of the surfactant/alcohol blend and 97 ml. of mud acid (12 wt.% HCl/3 wt.% HF). The oily sludge again disintegrated and dissolved rapidly.

From this it was concluded that the phosphate ester/high molecular weight alcohol complex performs well in acid alone without diluence, such as by the lower molecular weight alcohol or water.

EXAMPLES XXXIX-XLV

In order to test the compatibility of the acidizing compositions of the present invention with other types of acids, a series of 8 acidizing solutions was prepared using the 30% surfactant, 20% isooctyl alcohol, 40% isopropyl alcohol and 10% water composition (EXAMPLE XXIV) as a phosphate ester/alcohol concentrate as specified in the following TABLE II.

TABLE II

| ACIDIZING SOLUTION | 1 | 2 | 3 | 4 | 5 | 6 | 7 | 8 |
|---|---|---|---|---|---|---|---|---|
| Vol. % Concentrate | 20 | 20 | 20 | 20 | 15 | 20 | 10 | 25 |
| Vol. % glycolic acid | 40 | — | — | 10 | 8 | — | — | — |
| Vol. % sulfamic acid | — | — | — | 10 | 12 | — | — | — |
| Vol. % acetic acid | — | 40 | — | — | — | 15 | 10 | 20 |
| Vol. % citric acid | — | — | 40 | — | — | 10 | 10 | — |
| Vol. % HCl (32%) | — | — | — | — | — | 5 | — | — |
| Vol. % NH4HF2 | — | — | — | — | — | — | 5 | 10 |
| Vol. % isopropyl alcohol | 10 | 10 | 10 | 10 | 10 | — | — | — |
| Vol. % methyl alcohol | — | — | — | — | — | 10 | 10 | 15 |
| Vol. % water | 30 | 30 | 30 | 50 | 55 | 40 | 55 | 30 |

As previously indicated the acid solutions to which the surfactant/alcohol mixtures are added may be any of the aqueous solutions of water soluble acids commonly employed for acidizing formations. The aqueous acid solutions may contain from less than about 5% up to about 30% by weight of the acid, yet the phosphate ester surfactant/high molecular weight alcohol mixture remains soluble and the acid solution remains stable. Preferrably, about a 7 to 15 wt.% HCl solution is used in well acidizing.

The present acidizing additive is viewed as being essentially compatible with any of the well known acidizing processes. It can be used to treat oil producing wells, such as in a water flooding process for an oil-bearing formation, and in other secondary and tertiary recovery schemes. In a producing well, the aqueous acid solution and surfactant/alcohol additive are injected into the oil-bearing formation, after which the well is returned to oil production. In a water-injection well, the acid and surfactant/alcohol additive are injected into the oil-bearing formation, which is followed by further fluid injection.

In either a producing or injection well, the surfactant/alcohol additive can be mixed with the acid solution or can precede and/or follow the acid solution, or any combination thereof. These processes can also be used in conjunction with spearheads and postflushes of other well known solvents for a variety of purposes such as but not limited to various aromatic solvents to remove asphaltene and other heavy deposits, various sulphur solvents and the like.

The principle value of the surfactant/alcohol additive preceding the acid solution is the displacement of the oil ahead of the acid, thus decreasing mixing and possibly emulsification. Such a batch or slug process also acts to dissolve or solubilize organic deposits which may otherwise block the flow of acids into the oil-bearing strata. This batch process of injecting a surfactant/alcohol additive also acts to breakdown emulsions which tend to form due to naturally present emulsifying agents. It is contemplated that by controlling the concentration of the additive present in sequential slug or batch injection, the specific functions of emulsion breakdown, organic deposit removal, and acidizing can be selectively controlled as required.

The advantages of the surfactant/alcohol additive being mixed with the acid are the solubilization of the oil in contact with the acid and the improved displacement of the oil by the acid, leaving solid surfaces, particularly finely divided solids, water-wet. Surfactant/alcohol additive following the acid is of value in displacing and dissolving oil and organic solids not displaced or dissolved by previous steps. This is particularly true if the additive has not been used in the previous steps. A batch of additive following the acid solution is particularly valuable in a water injection well to insure displacement of any remaining oil, thus making more pore space available for flow of injected water into the formation.

The amount of acid may be anywhere within the range from the few hundred to the several thousand gallons ordinarily used in well-acidizing. However, treatment is generally intended primarily for the zone immediately surrounding a well bore, so that volumes are usually somewhat smaller than average. Preferrably, they are from about 500 to about 5,000 U.S. gallons. Stated in another way, use of from about 10 to about 500 gallons of acid per foot of formation thickness, as recommended in U.S. Pat. No. 3,548,945, is satisfactory.

If a spearhead or preflush batch of surfactant/alcohol additive precedes the acid solution, the volume of this spearhead should vary from about 1% of the volume of acid solution for large acid treatments to about 100% of the acid solution volume for small acid treatments. In such cases the ratio of surfactant to high molecular weight alcohol can also be adjusted to account for their individual interaction with the oil deposits. About the same volumes should be used for batches of surfactant/alcohol additive used as an afterflush to dispace the acid solution into the formation.

When cleaning out injection wells, viz: removal of clogging sludges, emulsions and scales, where formation acidizing is not the primary objective, it is often advantageous to decrease tha total volume of acid solution and increase tha concentration of additive. This is economically attractive to keep cost low. Further, the ratio of higher alcohol/phosphate ester surfactant can be increased as in Example XV, in order to lower cost (since the surfactant is the most expensive).

As indicated above, the principal application of the present invention is to oil-producing wells and to injection wells in waterflooding operations or the like. The process is also sometimes helpful for treating gas wells and gas condensate wells. Many gas wells produce some oil, just as many oil wells produce some gas. Therefore, organic deposits can form in and around gas wells. Many gas wells produce water. Therefore, mineral deposits can also form in and around gas wells. When gas wells are acidized to remove such mineral deposits and otherwise increase the flow of gas to the wells, oil present in the formation can emulsify with the acid just as it can in oil wells. In such applications, the present invention's ability to foam is considered an advantage in recovering acid from the formation and when employing nitrogen for the same purpose. Thus it will be apparent that many of the same problems, which make the use of a surfactant/alcohol additive advisable in oil well acidizing, frequently also occur in gas and gas condensate wells.

The process for, and the advantages of, using the present surfactant/alcohol additive during acidizing can be better understood from the following examples.

EXAMPLE XLVI

In order to demonstrate the concept of using a substituted alcohol as the high molecular weight alcohol in the surfactant/alcohol additive, an ethoxylated nonyl phenol (4 mole ethylene oxide adduct) having a terminal hydroxyl group and sold under the tradename Surfonic N40 was employed. The Surfonic N40 had practically no solubility in 15 wt.% HCL (same as isooctyl) but does disperse (emulsify) into it. An additive composition of 25 ml. Surfonic N40, 25 ml. of Pluraflo OF-90, and 50 ml. of isopropyl alcohol was prepared. The additive made a clear solution from 2 to 10 vol.% in 15 wt.% HCl. 100 ml. of the 5 vol.% additive in 15 wt.% HCl was added to 5 grams of oily sludge. The observed solution/dispersion rate was not as fast or complete as previous isooctyl additives but the results were acceptable in that the solids were water wetted and no thick (emulsion) oil layer appeared on top. The experiment was repeated without the ethoxylated nonyl phenol, resulting in an unacceptable heavy viscous oil layer on top. It was concluded that Surfonic N40 was workable but not as good as the linear high molecular weight alcohols.

While the oil soluble, substantially water insoluble monohydric alcohols are preferred, other alcohols having similar solubility and hydrophile/lipophile balance (HLB) to the $C_6$ to $C_8$ linear alcohols may be employed. For example, the solubility and HLB of very high molecular weight ($C_{12}$-$C_{22}$) fatty alcohols, polypropylene or polybutylene glycols, alkyl substituted phenols and $C_{12-22}$ fatty acids can be shifted to the operable range by reacting these with a few moles of ethylene oxide. The resulting substances, having the required oil solubility and at least one terminal hydroxyl group to provide alcoholic character, can be represented by the general formula:

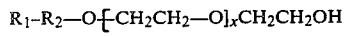

$$R_1-R_2-O-[CH_2CH_2-O]_xCH_2CH_2OH$$

where $R_1$ is a $CH_3-$ or $-CH_2CH_2OH$, $R_2$ is a $C_{11}$ to $C_{21}$ hydrocarbon chain, polypropylene oxide, polybutylene oxide, or $-(CH_2)_{10\ to\ 20}CO-$ fatty acid residue, alkyl ($C_8$-$C_{10}$) substituted phenyl moiety, and x is an integer ranging from 3 to 15 representing the number of moles of ethylene oxide added to $R_2$.

EXAMPLES XLVII–LIII

A series of field tests of the present invention were performed on water injection wells, oil producing wells and gas producing wells. Each field test involved the use of an additive containing 30 vol.% Klearfax AA-270 as the phosphate ester surfactant, 20 vol.% isooctyl alcohol, 40 vol.% isopropyl alcohol and 10 vol.% water. The results of these tests are presented in TABLE III.

TABLE III

| Type | Location (Co., TX) | Formation/ Depth | Volume (gal) Acid/Additive | Production Before/After |
|---|---|---|---|---|
| wiw* | Cass | Haynes Mitchell/ 4500' | 950/ 50 | 10,407 bbl @ 950 psig/ 10,482 bbl @ 400 psig |
| gas** | Panola | Pettit/ 6400' | 475/ 25 | 250 MCFD/600 MCFD |
| oil*** | Rusk | Woodbine/ 3700' | 1140/ 60 | 10 oil; 211 water/ 56 oil; 168 water bbl |
| oil | Wood | Subclarksville/ 4000' | 950/ 50 | 11 oil; 32 water/ 16 oil; 70 water bbl |
| gas | Marion | Travis Peak/ 8700' | 950/ 50 | 300 MCFD @ 600#; no choke 1.2M MCFD @ 1700#; 17/64 choke |

TABLE III-continued

| Type | Location (Co., TX) | Formation/ Depth | Volume (gal) Acid/Additive | Production Before/After |
|---|---|---|---|---|
| gas | Henderson | Rodessa/ 7000' | 2850/ 150 | 10 MCFD/ 710 MCFD |
| oil | Cherokee | Woodbine/ 3600' | 950/ 50 | 19 oil; 28 water/ 59 oil; 28 water bbl |

*wiw = water injection well
**gas = gas production
***oil = oil production

EXAMPLE LIV

A water injection well, located in Smith County, Tex., and being used to inject water into the Paluxy formation at 650 ft. at the rate of 2000 bbls per day at 2000 psig, was treated with a mixture of 500 gallons of 15 wt.% HCl containing 5 vol.% of the additive of EXAMPLES XLVII-LIII and 200 gallons of xylene. The xylene and acidizing solution were mixed, then injected into the formation and allowed to soak for one hour. A salt water plus diverter mixture was then used to flush the formation and an additional 3500 gallons of the acidizing solution (with 5 vol.% additive) was injected. Water injection was then resumed. Before treatment the well was accepting 2000 bbls of water per day at 2000 psig. After treatment water injection was 4500 bbls at 500 psig.

It should be readily apparent from the above that in addition to the advantages of economy of additive employed relative to prior art compositions, the process of employing the present compositions leads to a savings associated with operating injection wells and increased production associated with gas and oil producing wells.

Having thus described the preferred embodiments of the invention with a certain degree of particularlity, it is to be recognized and understood that many changes can be made in the details of preparing and using the surfactant/alcohol additive and acidizing solution without departing from the spirit and scope of this disclosure. Thus it is contemplated that other acid stable additives intended for various specific purposes can be present, including by way of example such additives as corrosion inhibitors, formation stabilizing additives, tracer compounds, emulsion breakers, asphaltene solvents and the like. Therefore, it is to be understood that the invention is not limited to the embodiments set forth herein for purposes of exemplification, but is to be limited only by the scope of the attached claims including a full range of equivalents to which each element thereof is entitled.

I claim:

1. An aqueous acid containing oil and gas well treating solution comprising:
   (a) an aqueous acid continuous phase;
   (b) a $C_4$ to $C_{10}$ substantially water insoluble aliphatic alcohol; and
   (c) an effective amount of a phosphate ester surfactant to render said alcohol soluble in said aqueous acid continuous phase wherein said phosphate ester surfactant is characterized by the formulas:

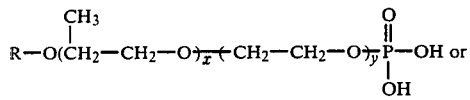

-continued

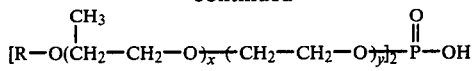

where R is about a $C_8$ to $C_{18}$ alkyl group or about a $C_8$ to $C_9$ alkyl substituted phenyl group, x is from about 2 to 6 and y is from about 12 to 22 and wherein the 2 to 6 units of propylene oxide are substantially a block polymer attached to the R—O group and wherein the 12 to 22 units of ethylene oxide are substantially a block polymer, wherein at least 75 parts by volume of said aqueous acid continuous phase containing up to 28 wt.% acid is combined with up to 25 parts by volume of a mixture of said alcohol and said phosphate ester surfactant wherein said mixture comprises up to about 8 parts by volume surfactant.

2. A treating solution of claim 1 wherein said acid is selected from the group consisting of HCl, HF, acetic, sulfamic, citric, glycolic, $NH_4HF_2$, and mixtures thereof.

3. A treating solution of claim 1 wherein said aliphatic alcohol is a $C_6$ to $C_8$ alcohol.

4. A treating solution of claim 1 wherein said phosphate ester surfactant is a phosphate ester of an oxyalkylated fatty alcohol.

5. A treating solution of claim 1 wherein said acid is HCl, HF or mixtures thereof, said aliphatic alcohol is octyl or capryl alcohol, and said phosphate ester surfactant is a phosphate ester of oxyalkylated fatty alcohol.

6. A treating solution of claim 5 wherein said aqueous acid continuous phase is 15 wt. % HCl, said aliphatic alcohol is isooctyl alcohol, and said phosphate ester surfactant is oxirane, methyl-, polymer with oxirane, mono-$C_{10}$-$C_{18}$-alkyl ethers, phosphates.

7. A treating solution of claim 1 further comprising an effective amount of a low molecular weight water soluble alcohol or diol.

8. A treating solution of claim 1 wherein at least 90 parts by volume of said acid is combined with up to 10 parts by volume of said mixture.

9. An acidizing additive comprising:
   (a) a $C_4$ to $C_{10}$ substantially water insoluble aliphatic alcohol;
   (b) a phosphate ester surfactant characterized by the formulas:

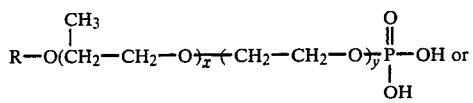

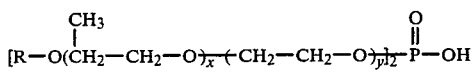

where R is about a $C_8$ to $C_{18}$ alkyl group or about a $C_8$ to $C_9$ alkyl substituted phenyl group, x is from about 2 to 6 and y is from about 12 to 22 and wherein the 2 to 6 units of propylene oxide are substantially a block polymer attached to the R—O group and wherein the 12 to 22 units of ethylene oxide are substantially a block polymer;

(c) a water soluble low molecular weight alcohol or diol; and (d) water, wherein said insoluble aliphatic alcohol is present in an amount of 20 to 160 parts by volume of said surfactant and the volume of the water soluble alochol or diol plus water is approximately equal to the sum of the volumes of the surfactant and the insoluble alcohol and wherein the water is present in a range of about 2 to 20 volume percent of the resulting additive.

10. An acidizing additive of claim 9 wherein said water soluble low molecular weight alcohol or diol is selected from the group consisting of methanol, ethanol, n-propanol, isopropyl alcohol, t-butyl alcohol, and ethylene glycol.

11. An acidizing additive of claim 9 wherein said water insoluble alcohol is a $C_6$ to $C_8$ alcohol and said surfactant is a phosphate ester of an oxyalkylated fatty alcohol.

12. An acidizing additive of claim 10 wherein said water insoluble alcohol is a $C_6$ to $C_8$ alcohol and said surfactant is a phosphate ester of an oxyalkylated fatty alcohol.

13. An acidizing additive of claim 9 wherein the ratio of substantially water insoluble aliphatic alcohol to surfactant ranges from about 1 part by volume alcohol per 4 parts by volume surfactant to 8 parts by volume alcohol per 5 parts by volume surfactant.

14. An acidizing additive of claim 13 wherein the ratio of substantially water insoluble aliphatic alcohol to surfactant is about two to three.

15. An acidizing additive of claim 9 wherein said water is present in at least 2% by volume and less than about 20% by volume.

16. An acidizing additive of claim 15 wherein the ratio of substantially water insoluble aliphatic alcohol to surfactant ranges from about 1 part by volume alcohol per 4 parts by volume surfactant to 8 parts by volume alcohol per 5 parts per volume surfactant.

17. An acidizing additive of claim 16 wherein said ratio of substantially water insoluble aliphatic alcohol to surfactant is about two to three.

18. An acidizing additive of claim 16 wherein said water insoluble alcohol is a $C_6$ to $C_8$ alcohol.

19. An acidizing additive of claim 16 wherein said insoluble alcohol is isooctyl alcohol.

20. A process for treating an oil-bearing formation comprising the step of contacting said formation with an aqueous acid solution containing up to 28 wt.% acid and containing up to 25 parts by volume of a combination of a $C_4$ to $C_{10}$ substantially water insoluble aliphatic alcohol and an effective amount of a phosphate ester surfactant to render said alcohol soluble in said acid solution wherein said phosphate ester surfactant is characterized by the formulas:

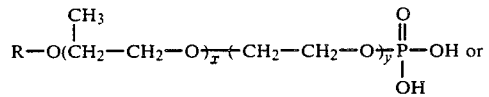

-continued

where R is about a $C_8$ to $C_{18}$ alkyl group or about a $C_8$ to $C_9$ alkyl substituted phenyl group, x is from about 2 to 6 and y is from about 12 to 22 and wherein the 2 to 6 units of propylene oxide are subtantially a block polymer attached to the R—O group and wherein the 12 to 22 units of ethylene oxide are substantially a block polymer and wherein said combination comprises up to about 8 parts by volume of said water insoluble alcohol to 5 parts by volume surfactant.

21. A process of claim 20 wherein said phosphate ester surfactant is a phosphate ester of an oxyalkylated fatty alcohol.

22. A process of claim 20 wherein said aliphatic alcohol is a $C_6$ to $C_8$ alcohol.

23. A process of claim 21 wherein said aliphatic alcohol is a $C_6$ to $C_8$ alcohol.

24. A process of claim 20 wherein said aliphatic alcohol is isooctyl alcohol.

25. A process of claim 21 wherein said aliphatic alcohol is isooctyl alcohol.

26. A process of claim 21 wherein said phosphate ester surfactant is oxirane, methyl-, polymer with oxirane, mono-$C_{10}$-$C_{18}$-alkyl ethers, phosphates.

27. A process of claim 20 wherein said aqueous acid solution also contains a water soluble low molecular weight alcohol or diol.

28. An aqueous acid containing oil and gas well treating solution comprising:

(a) an aqueous acid continuous phase;

(b) a substantially water insoluble alcohol of the formula:

$$R_1\text{-}R_2O\text{---}[CH_2CH_2\text{-}O]_xCH_2CH_2OH$$

where $R_1$ is a $CH_3$— or —$CH_2CH_2OH$; $R_2$ is a $C_{11}$ to $C_{21}$ hydrocarbon chain, polypropylene oxide, polybutylene oxide or —$(CH_2—)_{10}$ to $_{20}CO$-fatty acid residue, and x is an integer from about 3 to 15; and (c) an effective amount of a phosphate ester surfactant to render said alcohol soluble in said aqueous acid continuous phase wherein said phosphate ester surfactant is characterized by the formulas:

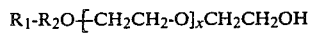

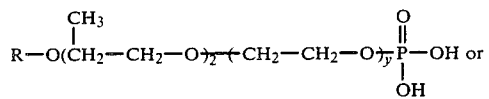

where R is about a $C_8$ to $C_{18}$ alkyl group or about a $C_8$ to $C_9$ alkyl substituted phenyl group, x is from about 2 to 6 and y is from about 12 to 22 and wherein the 2 to 6 units of propylene oxide are substantially a block polymer attached to the R—O group and wherein the 12 to 22 units of ethylene oxide are substantially a block polymer wherein at least 75 parts by volume of said aqueous acid continuous phase containing up to 28 wt.% acid is combined with up to 25 parts by volume of a mixture of said alcohol and said phosphate ester surfactant wherein said mixture comprises up to about 8 parts by volume surfactant.

29. A process for treating an oil bearing formation comprising the step of contacting said formation with a composition of claim 28.

* * * * *